W. A. CALVIN.
CULTIVATOR.
APPLICATION FILED JUNE 1, 1911.

1,040,879.

Patented Oct. 8, 1912.

3 SHEETS—SHEET 2.

WITNESSES
Philip E. Barnes
Edna J. Sheehy

INVENTOR
W. A. Calvin,
by
James J. Sheehy & Co.,
Attorneys.

W. A. CALVIN.
OULTIVATOR.
APPLICATION FILED JUNE 1, 1911.

1,040,879.

Patented Oct. 8, 1912.
3 SHEETS—SHEET 3.

WITNESSES
Philip E. Barnes
W. C. Healy

INVENTOR
W. A. Calvin
By James Shuley & Co. Attorneys

UNITED STATES PATENT OFFICE.

WILLIAM A. CALVIN, OF MANHATTAN, KANSAS.

CULTIVATOR.

1,040,879.   Specification of Letters Patent.   Patented Oct. 8, 1912.

Application filed June 1, 1911. Serial No. 630,644.

*To all whom it may concern:*

Be it known that I, WILLIAM A. CALVIN, a citizen of the United States, residing at Manhattan, in the county of Riley and State of Kansas, have invented new and useful Improvements in Cultivators, of which the following is a specification.

My present invention pertains to cultivators, and more particularly to cultivators of the two-row type; and it consists in the peculiar and advantageous cultivator hereinafter described and particularly pointed out in the claims appended.

Figure 1:
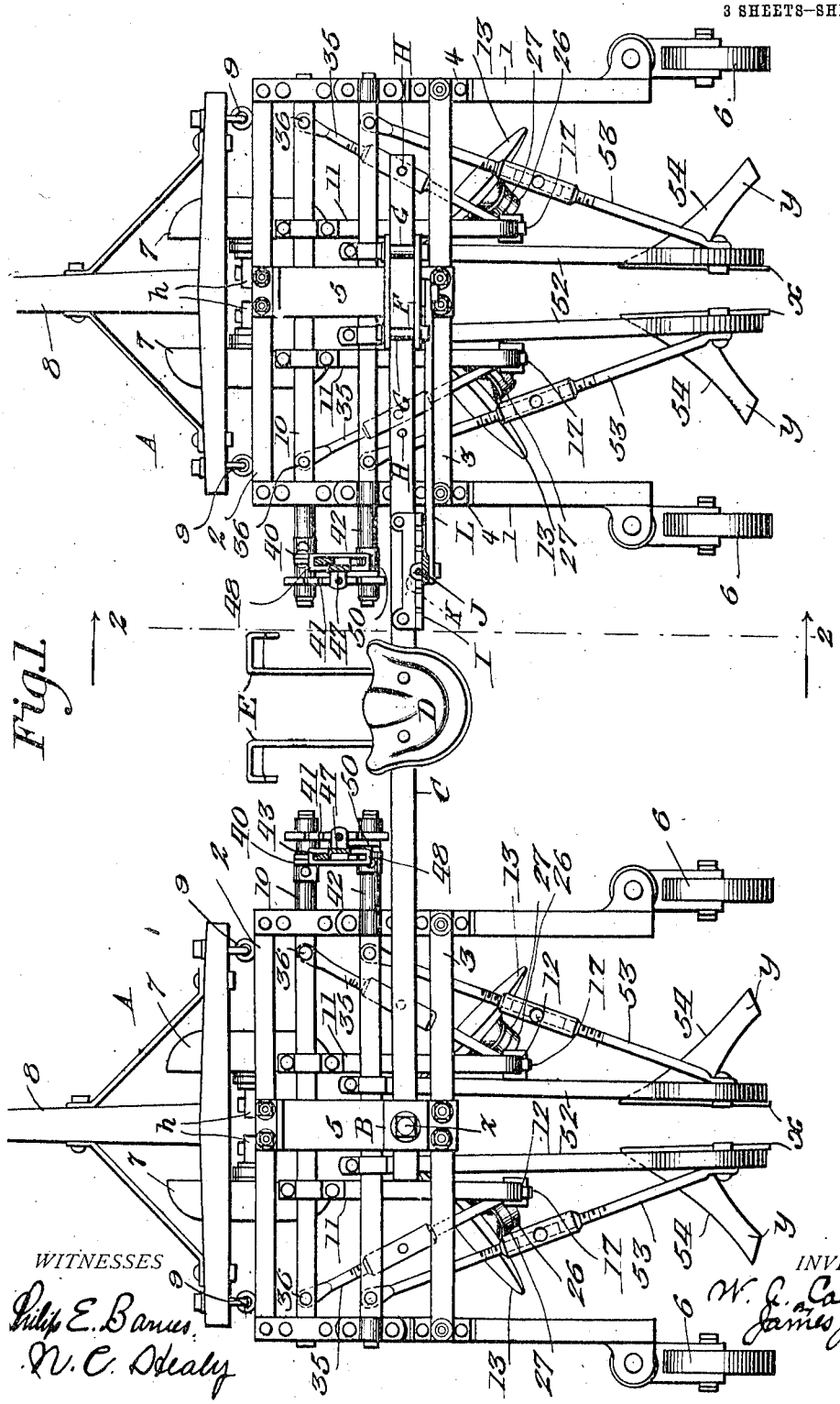
Figure 2:
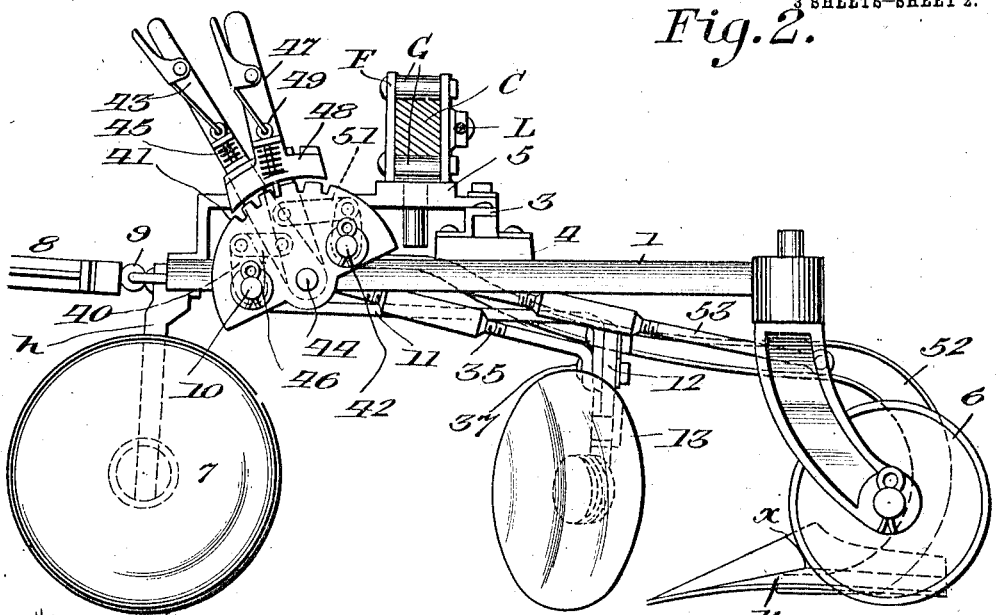
Figure 3:
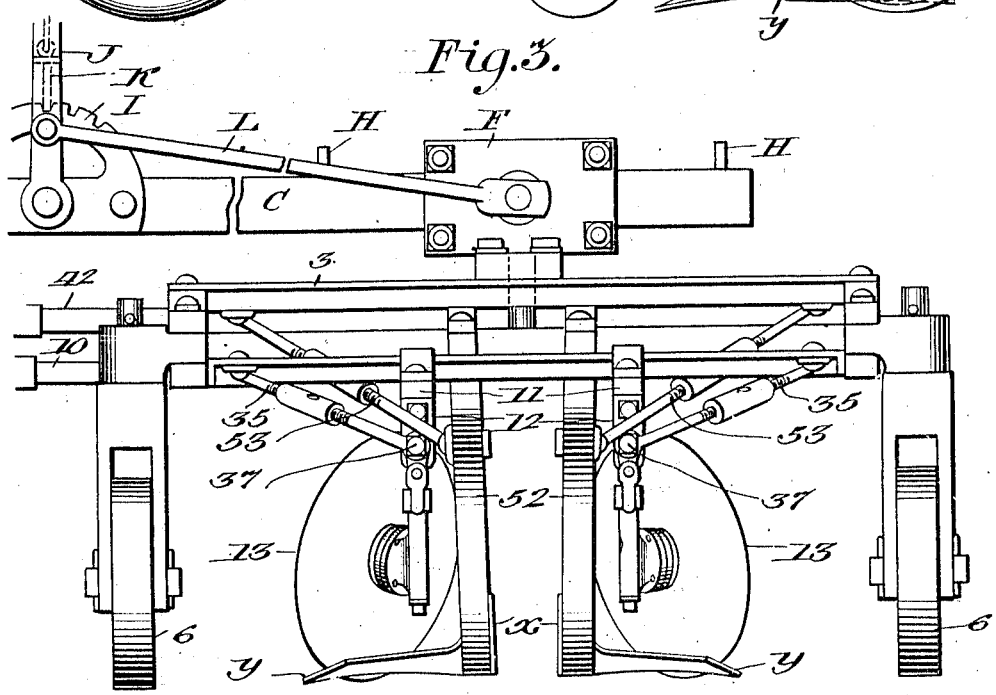
Figure 4:
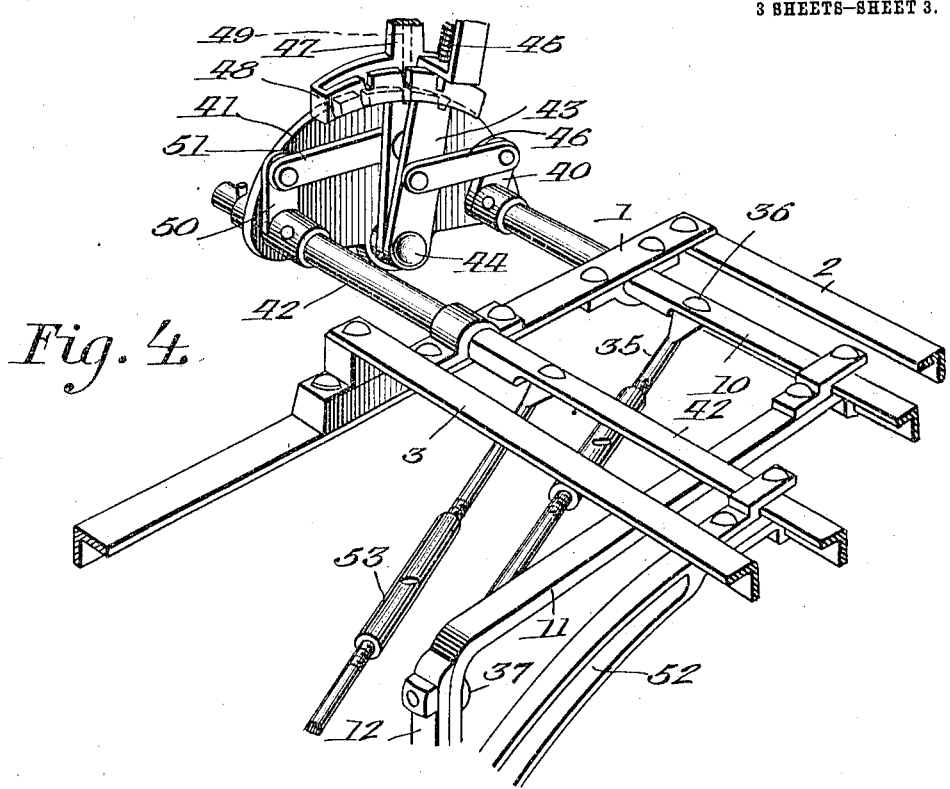

In the drawings accompanying and forming part of this specification: Figure 1 is a plan illustrating a two-row cultivator embodying my invention. Fig. 2 is a vertical section on an enlarged scale, taken in the plane indicated by the line 2—2 of Fig. 1 and showing in side elevation the right-hand member of the two-row cultivator. Fig. 3 is a rear elevation of the said member. Fig. 4 is an enlarged fragmentary perspective illustrative of the manner in which the rockshafts complementary to the disks and the plows, respectively, are connected with the levers for rocking said shafts.

Similar letters and numerals designate corresponding parts in all of the views of the drawings.

The two-row cultivator comprises two members A connected together in the manner shown in Fig. 1 and hereinafter described, and as the said members A are identical in construction a detailed description of the one shown at the right of Fig. 1 and in Figs. 2, 3 and 4 will suffice to impart a definite understanding of both.

Among other features the members A referred to comprise a main frame. This of course may be of any construction consonant with the purpose of my invention without involving departure from the scope of the same as claimed, though I prefer to have it comprise side bars 1, a front cross-bar 2 fixed to and extending between said side bars, an intermediate cross-bar 3 fixed to and extending between blocks 4 on the side bars, and a longitudinally-disposed raised support 5, occupying the longitudinal center of the member and fixed at its ends to the crossbars 2 and 3. The rear end of the main frame is supported by ground wheels 6, of the caster type, and the forward end of said frame is supported by ground wheels 7, connected through hangers $h$ with said forward end.

The hangers $h$ are clipped or otherwise adjustably fixed on the forward frame bar 2 of the member A, and consequently the wheels 7 may be spaced quite close together as when corn is to be plowed the first time, or may be arranged a considerable distance apart, as when corn is to be plowed the last time. It is also to be noted here that when corn is to be plowed the first time the wheels 7 are relatively arranged as shown in Fig. 1, while when corn is to be plowed the last time and the said wheels are spaced a greater distance apart, I prefer that the hangers $h$ be reversed on the frame bar 1 so that the convex sides of the widely separated wheels will be opposed to each other.

As before stated, the wheels 7 bear the weight of the forward portion of the member A and from this it follows that the draft animals are called upon to bear only the weight of the tongue 8; said tongue being hinged at the points 9 to the front bar 1 of the main frame.

Journaled in suitable bearings carried by the side bars 1 and arranged immediately in rear of the frame bar 2 is a transverse rock-shaft 10 that extends inward beyond the inner side bar 1, and clipped or otherwise adjustably fixed on the said shaft 10 so as to be capable of being adjusted in the direction of the length thereof are disk beams 11. These beams 11 extend rearward from the shaft 10, and each is provided at its rear end with a depending portion or shank 12 on which a disk 13 is carried.

The disk beams 11 may be placed close together for the first plowing of corn and comparatively far apart for the last plowing thereof, as before stated, and in either case it will be manifest that the said beams will be adequately braced by braces 35 each of which is disposed at an acute angle to its respective beam, and is made up of a forward rod section, pivoted at 36 to the rockshaft 10, a rear rod section connected at 37 to the respective beam, and a turn-buckle interposed between and adjustably connecting the rod sections and by manipulation of which the brace may be increased or diminished in length. The said braces 35 combined with the beams 11 render the latter absolutely rigid and eliminate all side draft, twist and strain on the beams with the result that the draft is directly in the line of operation or forward movement of the member.

When the beams 11 are arranged a greater distance apart than is shown in Fig. 1, the braces 35 are, of course, shortened, while when the beams are arranged closer together, said braces are increased in length. I would also have it here understood that when the beams 11 are arranged a great distance apart, as for the plowing of corn the last time, the disks 13 are reversed on the rear depending portions of said beams—i. e., are arranged with their concave sides inward or opposed instead of with their convex sides opposed in the manner shown in Fig. 1.

By rocking of the shaft 10, the disks 13 may be put into and raised out of the ground, and for the purpose of rocking said shaft and adjustably fixing the same and the disks, I provide the mechanism best shown in Fig. 4, which mechanism comprises a crank 40 fixed on shaft 10, a segmental rack 41 mounted on the shaft 10 and a second rock-shaft 42, a hand lever 43, fulcrumed at 44 on the rack and carrying a detent 45, a link 46 connecting the crank 40 with the lever 43, and a second hand lever 47 fulcrumed at 44 on rack 41 and carrying a segmental rack 48 for the engagement of the said detent 45. The second-named hand lever 47 carries a conventional or other suitable detent 49 (see dotted lines in Fig. 4) to engage the rack 41, and when said lever 47 is fixed to said rack 41, and the lever 43 is fixed to the rack 48 on lever 47, it will be manifest that the disk beams and the disks will be adjustably fixed in raised or depressed positions, as the case may be.

The rock-shaft 42 is journaled in the main frame, at a point in rear of the rock-shaft 10, and is extended inward beyond the frame in the same manner as said shaft 10. Said shaft 42 is provided on its extended portion with a crank 50 which is connected through a link 51 with the lever 47. From this it follows that when lever 47 is thrown in one direction the plows carried by shaft 42 will be depressed, and when said lever is thrown in the opposite direction, said plows will be raised.

The plow beams 52 are clipped or otherwise adjustably fixed on the shaft 42 so as to be capable of adjustment in the direction of the length of said shaft, and are braced by braces 53 constructed like the before described braces 35 and arranged with respect to the shaft 42 and the beams 52 in the same manner that said braces 35 are arranged with respect to the shaft 10 and disk beams 11. Said braces 53 are, however, much longer than the braces 35 because of the disposition of the plows 54 considerably in rear of the disks 13. For plowing corn the first time the said plows 54 are arranged as shown in Fig. 1—i. e., with their longitudinal vertical portions $x$ opposed to each other and quite close together, while for plowing corn the last time the plow beams 52 and the plows 54 are arranged a considerable distance apart, and the said plows 54 are reversed on the beams—i. e., are arranged with their longitudinal vertical portions $x$ outermost and their mold-boards $y$ innermost or opposed to each other.

It will be gathered from the foregoing that like the disk beams 11, the plow beams 52 are so arranged as to render them practically rigid and free from side draft, twist and strain, and adapted to draw directly in line of operation. It will also be appreciated that the adjustment of both disks and plows is convenient, and that when the plows are thrust into the ground, they serve to carry and hold the disks in the ground, and this notwithstanding the tendency of the disks to throw themselves out of the ground. It will be further understood that all of the features described and the advantages ascribed to said features are common to the two members A of the two-row cultivator.

On the support 5 of one member A, preferably the member A at the left, is pivoted a boxing B, and in said boxing is fixed, preferably in an adjustable manner by a set screw $z$, a coupling bar C which carries a driver's seat D and foot rests E. The said coupling bar extends loosely through a box F pivoted to swing horizontally on the support 5 of the right-hand member A; the said box F being provided at its ends and above and below the bar C with anti-friction rollers G, and the bar being provided with stops H to limit its movement through the box. At I the bar C is provided with a segmental rack that is fixed thereon, and fulcrumed on the bar is a hand lever J which is equipped with a detent K designed to engage said rack I. The lever J is connected through a link rod L with the box F on right-hand member A. By reason of the connection described between the members A and the convenient arrangement of the lever J relative to the driver's seat, the driver is enabled to maintain himself in the center of the apparatus when the same is on sidling ground.

As before stated each of the plows 54 comprised in my cultivator is made up of a longitudinal vertical portion $x$ and a mold board $y$, and by comparison of Figs. 1, 2 and 3, it will be seen that the mold-board $y$ extends laterally from the forward upper part of the portion $x$ and has its major portion disposed at a sharp acute angle to the horizontal. From this it follows that the portions $y$ of the plow will establish roots—i. e., assure the same growing in the direction desired. In other words, as the roots will grow in the direction of least resistance, they will grow where the plow portions y have passed through the soil. Because of this the plow portions will never break a root and will leave the roots under the mulch or loose soil that retains the moisture and is therefore calculated to promote the growth of the roots.

My novel cultivator is especially adapted for plowing listed corn since it cuts the ridge from row to row so that the roots may pass under and at the same time avoids cutting the roots. It is also well adapted for the plowing of beets, cotton and the like.

When shallow culture is desired the cultivator is set shallow, whereupon the plow portions y will shave the weeds and clean the field on the first plowing. Moreover the cultivator can be used to advantage in plowing corn from first to last.

The invention, broadly considered, is not limited to the specific construction illustrated, nor to any specific construction, as many changes may be made in the construction without departing from the main principles of the invention and without sacrificing its chief advantages.

Having described my invention, what I claim and desire to secure by Letters-Patent, is:

1. In a cultivator, the combination of a frame having a forward cross-bar, ground wheels of the caster type supporting the rear portion of the frame, hangers adjustably fixed on said forward frame bar and adjustable in the direction of the length of said bar, ground wheels carried by said hangers, transverse rock-shafts journaled on the frame, beams adjustably fixed on and extending rearward from the forward rock-shaft and adjustable lengthwise of said shaft, lengthwise adjustable braces disposed at acute angles to the beams and connected at their rear ends to the beams and pivotally connected at their forward ends to the rock-shaft, beams adjustably fixed on and extending rearward from the rear rock-shaft and adjustable lengthwise of said shaft, lengthwise adjustable braces disposed at acute angles to said beams and connected at their rear ends to the beams and pivotally connected at their forward ends to the rear rock-shaft, and means supported directly and entirely upon the rock-shafts for adjustably fixing said shafts.

2. In a cultivator, the combination of a wheel-supported main frame, transverse rock-shafts thereon, a beam fixed to and extending rearward from one of the shafts, a beam fixed to and extending rearward from the other shaft, ground-working devices carried by said beams, levers supported on the shafts and adapted to rock the same and carrying detents, means supported on the shafts and adapted to coöperate with the detent of one lever in adjustably fixing the same, and means carried by said lever and adapted to coöperate with the other lever in adjustably fixing the latter.

3. In a cultivator, the combination of a wheel-supported main frame, transverse rock-shafts journaled thereon, beams fixed to and extending rearward from and adjustable on one of the shafts in the direction of the length thereof, lengthwise-adjustable braces disposed at acute angles to said beams and connected at their rear ends to the beams and pivotally connected at their forward ends to the shaft, ground-working devices carried by said beams, beams fixed to and extending rearward from and adjustable on the other shaft in the direction of the length thereof, lengthwise-adjustable braces disposed at acute angles to said beams and connected at their rear ends to the beams and pivotally connected at their forward ends to the respective shaft of said beams, ground-working devices carried by said beams, hand levers supported by and adapted to rock the shafts and provided with detents, a segmental rack supported by the shafts and adapted to coöperate with one of the levers in adjustably fixing the same, and a rack carried by said lever and adapted to coöperate with the detent of the other lever in adjustably fixing the latter.

4. In a cultivator, the combination of a wheel-supported main frame, transverse rock-shafts journaled thereon and arranged one in front of the other, levers supported by and adapted to rock said shafts and provided with detents, a segmental rack supported on the shafts and adapted to coöperate with one of the levers in adjustably fixing the same, a rack carried by said lever and adapted to coöperate with the detent of the other lever in adjustably fixing the latter, beams fixed on and extending rearward from and adjustable on the forward shaft in the direction of the length thereof, disks carried by said beams, beams fixed on and extending rearward from and adjustable on the rear shaft in the direction of the length thereof, plows carried by the latter beams and disposed in rear of the disks, lengthwise adjustable braces disposed at acute angles to the first-named beams and connected at their rear ends thereto and pivotally connected at their forward ends to the forward rock-shaft, and lengthwise adjustable braces disposed at acute angles to and connected at their rear ends to the second-named beams and pivotally connected at their forward ends to the rear rock-shaft.

5. In a cultivator, the combination of a frame having a forward cross-bar, ground wheels, of the caster type, supporting the rear portion of the frame, hangers adjustably fixed on said forward frame bar and adjustable in the direction of the length of said bar, ground wheels carried by said hangers, transverse rock-shafts journaled on the frame, beams adjustably fixed on and extending rearward from the forward rock-shaft and adjustable lengthwise of said shaft, beams adjustably fixed on and extending rearward from the rear rock-shaft and adjustable lengthwise of said shaft, ground-working devices carried by said beams, and means supported directly and entirely upon the rock-shafts for adjustably fixing the rock-shafts.

In testimony whereof I have hereunto set my hand in presence of two subscribing witnesses.

WILLIAM A. CALVIN.

Witnesses:
EMIL THOES,
T. J. RAGLAND.

Copies of this patent may be obtained for five cents each, by addressing the "Commissioner of Patents, Washington, D. C."